United States Patent [19]

Hinson et al.

[11] Patent Number: 4,617,381

[45] Date of Patent: Oct. 14, 1986

[54] PROCESS FOR THE PREPARATION OF CONCENTRATED STABLE LIQUID DYE SOLUTIONS OF CI DIRECT YELLOW 11 UTILIZING AN ALKANOL/WATER SOLVENT IN A DESALTING PROCEDURE

[75] Inventors: James W. Hinson, Jackson; Jo A. Cleverdon, Mobile, both of Ala.

[73] Assignee: Ciba-Geigy Corporation, Ardsley, N.Y.

[21] Appl. No.: 649,342

[22] Filed: Sep. 11, 1984

[51] Int. Cl.$^4$ .................... C09B 27/00; C09B 46/00; D06P 1/90

[52] U.S. Cl. ........................................ 534/576; 8/604; 8/662; 8/664; 8/682; 534/571; 534/582; 534/583; 534/689; 534/728; 534/887

[58] Field of Search ............... 534/689, 576, 887, 571, 534/728, 582, 583; 8/662, 664, 682, 604

[56] References Cited

U.S. PATENT DOCUMENTS

| | | | |
|---|---|---|---|
| 2,865,908 | 12/1958 | De Hoff | 534/689 X |
| 3,483,183 | 12/1969 | Ingleman | 534/681 |
| 3,657,220 | 4/1972 | Kilmurry | 534/728 X |
| 3,679,353 | 7/1972 | Streck | 534/576 |
| 3,681,319 | 8/1972 | Jabes | 534/728 X |
| 3,681,320 | 8/1972 | Franklin | 534/728 X |
| 3,905,949 | 9/1975 | Perkins et al. | 534/689 X |
| 4,002,424 | 1/1977 | Smith | 534/728 X |
| 4,126,608 | 11/1978 | Pedrazzi | 534/689 X |
| 4,141,889 | 2/1979 | Allan | 534/689 |
| 4,310,331 | 1/1982 | Arsac et al. | 534/728 X |
| 4,490,151 | 12/1984 | Brode | 534/689 X |
| 4,560,745 | 12/1985 | Weberndoefer et al. | 534/689 X |

*Primary Examiner*—Floyd D. Higel
*Attorney, Agent, or Firm*—Karl F. Jorda

[57] ABSTRACT

A process is disclosed for the preparation of concentrated stable liquid dye solutions of CI Direct Yellow 11 starting with the product of the basic condensation of para-nitrotoluene-ortho-sulfonic acid in the form of its tetrasodium reaction mass or the wet filter cake separation of the solids from said mass and the reaction liquids or the dry technical grade sodium complex which is the dried filter cake. The solid starting material is suspended in a lower alkanol/water medium; the suspension is acidified to a pH below about 2.5 to acidify each sulfo moiety on the chromophore and to form the free inorganic salt; this acidified suspension is heated to assure completion of the metathetical salt-forming reaction; after sufficient heating, the mixture of the acidified chromophore and the salt is neutralized to a pH in the range 6.0 to 7.5 with an alkanolamine from an alcohol of from 2 to 5 carbon atoms in which the acidified chromophore is soluble by virtue of forming a water-soluble alkanolamine complex and forming a precipitate of the salt which is insoluble in the alkanol/water mixture; lastly the salt is removed from the solution which is concentrated by distilling of the alkanol and water.

9 Claims, No Drawings

PROCESS FOR THE PREPARATION OF CONCENTRATED STABLE LIQUID DYE SOLUTIONS OF CI DIRECT YELLOW 11 UTILIZING AN ALKANOL/WATER SOLVENT IN A DESALTING PROCEDURE

BACKGROUND OF THE INVENTION

This invention relates to a process for preparing concentrated stable liquid dye solutions of CI Direct Yellow 11 (Paper Yellow 11). Paper Yellow 11 is an intense yellow stilbeneazo(xy) dye that is very substantive to cellulose. The structure assigned to this dyestuff is

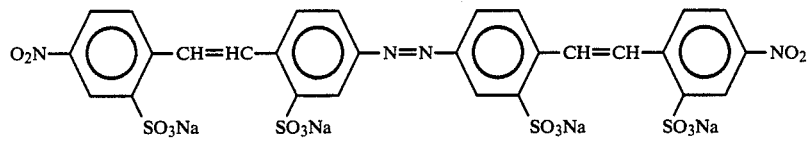

It is produced by a well known and well publicized process. The industrial process was described in BIOS Report 1548 after world War II. It is based on the self-condensation of 5-nitro-ortho-toluene sulfonic acid in the presence of a concentrated alkali metal hydroxide solution. The products obtained are the alkali metal complexes of the stilbeneazo(xy) dye.

The 5-nitro-ortho-toluene sulfonic acid is neutralized by the base, usually sodium hydroxide and the solution is heated to 50°–90° C. for several hours to promote the condensation. The excess base is neutralized with sulfuric or hydrochloric acid. The dye is filtered from the reaction mass. It is marketed as the wet cake or the cake is dried.

The neutralized dye is a sodium salt complex of the chromophore and is only sparingly soluble in water (1–5%). With other stilbene dyes the poorly soluble salts are converted to more soluble salt to achieve improved solubility. This would be accomplished by precipitating the chromophore in its free acid form by the addition of acid. This free acid form is then converted to a more soluble salt by dissolving it in an appropriate base. However, this standard method for improving solubility to form dye solutions is inappropriate for Paper Yellow 11 (Direct Yellow 11) as its free acid form has extremely poor filtration characteristics. The salts formed during the acid neutralization with sulfuric or hydrochloric acid (sodium sulfate or sodium chloride) form a viscous slime. This slime could not be filtered using conventional equipment. Because of this filtration problem, the salts could not be removed from the resultant wet cake. Removal of the salt is necessary for the formation of liquid Paper Yellow 11 concentrates.

Concentrates of Paper 11 are desireable for pulp dyeing in paper manufacture, but such concentrates have not been readily available.

There have been several methods proposed heretofore for obtaining the desired Paper Yellow 11 concentrates. They have primarily been based on redesign of the condensation reaction to directly provide the dye as a concentrated aqueous solution. These methods have had several shortcomings due either to instability of the final product during industrial storage and economical or ecological drawbacks.

U.S. Pat. No. 3,905,949, issued in 1975 to E. I. duPont describes a method of condensation in which the alkali metal base is lithium hydroxide. The final product is a highly concentrated, water-soluble dye paste. This soluble lithium salt complex is more substantive than the sodium salt complex. The disadvantage of this lithium-based paste product is that it does not form sufficiently stable dye solutions. On storage, the concentrated solutions within a short time, at elevated temperatures, formed gels and tended to crystallize or flocculate at slightly below room temperature (5°–15° C.). Such problems with "pot life" seriously interfere with industrial use of this invention.

It has also been proposed, in German Offenlegungsschrift No. 2,820,487, that the base-catalyzed 4-nitrotoluene-2-sulfonic acid be carried out in the presence of the reaction products of ammonia and ethylene oxide, sodium or lithium hydroxide. In German Offenlegungsschrift No. 3,046,450 this condensation takes place in the presence of a primary, secondary or tertiary amine and lithium hydroxide. It has been noted that at least some of the sulfo groups on the chromophore prepared in this manner are in the form of alkali metal salts.

German Offenlegungsschrift No. 3,110,261 describes the condensation in the presence of sodium hydroxide and alkanolamines in an aqueous/alcoholic medium. The organic solvent system including glycol-ethers as well as conventional alcohols provide stable dye solutions but has been ecologically faulted for the relatively large amounts of the glycol-ethers discharged in the waste waters after paper dyeing.

Another drawback has been the reduced solubility and poor stability of concentrated dye solutions because of the salt content of the finished dye solutions. Since the condensations are carried out in strongly basic media, the neutralization of these bases produces enough salts to adversely affect the stability and solubility of the dye. Desalting steps have been proposed.

In German Offenlegungsschrift No. 2,451,219, sodium ions are precipitated (after acidification) by means of the relatively expansive hexafluorosilicic and replaced by cations which improve solubility. This method requires an additional filtration step to remove the precipitated sodium hexafluorosilicate.

European Patent Application No. 53,220 offers a method for preparing low-electrolyte dyes, by first converting the dye to lipophilic amine salt which is separated from the highly electrolytic salt-containing reaction mass. The separated lipophilic amine salt is then reacted with diethanolamine to form the diethanolammonium salt. The lipophilic amine is recovered and recycled. This method is expensive and technically complicated in that two resalting stages are included, each requiring a difficult phase separation.

It is an object of this invention to provide a process for converting the product of the standard sodium hydroxide catalyzed condensation of 5-nitro-ortho-toluene sulfonic acid to liquid, water-soluble concentrates of Paper Yellow 11 (C.I. Direct Yellow 11) that are stable for storage as concentrates and in dyeing solution dilution.

THE INVENTION

The method of this invention involves a process for preparing a stable solution of (Colour Index) Direct Yellow 11 (Paper Yellow 11). The process involves starting with the product of the basic condensation of para-nitrotoluene-ortho-sulfonic acid in the form of its tetrasodium reaction mass; or the wet filter cake separation of the solids from said mass and the reaction liquids or the dry technical grade sodium complex which is the dried filter cake.

The solid starting material is suspended in a lower alkanol/water medium. The suspension is then acidified to a pH below about 2.5 with a strong acid to acidify each sulfo moiety on the chromophore and to form the free inorganic salt. This acidified suspension is then heated to assure completion of the metathetical salt-forming reaction. After sufficient heating, the mixture of the acidified chromophore and the salt is neutralized to a pH in the range 6.0 to 7.5 with an alkanolamine from an alcohol of from 2 to 5 carbon atoms in which the acidified chromophore is soluble by virtue of forming a water-soluble alkanolamine complex and forming a precipitate of the salt which is insoluble in the alkanol/water mixtue. The salt is removed from the solution which is then concentrated by distilling off the alkanol and water.

The resulting alkanolamine Paper 11 complex dissolved in the alkanolamine/water solution is stable during aging tests over long periods as well as at extremes of temperature. There are no salts to "salt out" the dyes in this esily handled, easily metered commercial liquid form. In addition, the presence of the alkanolamine permits accurate dispersion and solution of the dyestuff in the dyeing solutions used for dyeing paper in pulp or foil form. The dyestuff is so substantive to cellulose that the presence of the cellulosic component removes substantially all the dyestuff from the dyeing solution. In addition, the hydrophilic nature of the alkanolamine moieties on the chromophore ensure level dyeing from aqueous solutions on the "furnish" as well as on the final paper foil.

DETAILED DESCRIPTION

The starting materials for the process aspects of this invention are preferably either the wet cake or dried technical Paper Yellow 11. This is the material listed in the Colour Index as Direct Yellow 11 and is one of the materials described in the aforementioned BIOS 1548 report as Curcumine S and subsequently standardized in the Colour Index as Direct Yellow 11.

It was originally isolated from the condensation of 5-nitro-o-toluenesulfonic acid in 1883 by J. Walter and further characterized by F. Bender (1885) and E. Hepp (1892). The material which is a tetrasodium stilbeneazo(xy) complex is soluble in water only to the extent of 1% at room temperature and up to 5% in boiling water containing up to 15% urea.

The reaction of 5-nitro-o-toluene-sulfonic acid, (variously named as paranitrotoluene sulfonic acid, PNTSA, 4-nitrotoluene-2-sulfonic acid) and NaOH results in a Paper Yellow 11 reaction mass which is normally filtered to form the wet cake mentioned above and then subsequently the wet cake is dried to produce the Paper Yellow, technical grade. This technical grade can then be used in the process of this invention as can the aforementioned wet cake. The filtration and drying steps can be eliminated by adding the alkanol directly to the reaction mass.

Normally 500-600% excess NaOH is added to the PNTSA to "salt out" the Paper Yellow 11 to facilitate the filtration to form the aforementioned filter cake. Although Paper Yellow 11 can be formed using as little as 50-60% excess NaOH, a filtration is impossible at that low concentration. Liquid Paper Yellow, however, can be successfully produced using only 50-60% excess NaOH because no filtration step is necessary. Of course, the lower excess of NaOH provides considerable savings in NaOH and $H_2SO_4$.

The alkanol used for the process of this invention is one which will dissolve the free acid form of Paper Yellow 11 and in which the sodium salt of the acid used to form the Paper Yellow free acid is insoluble. Experimentation has shown that only methanol and ethanol meet these criteria. Higher alkanols do not sufficiently dissolve the free acid of Paper Yellow 11.

Both lower alkanols adequately dissolve the free acid of Paper Yellow 11 and precipitate the sodium sulfate formed when sulfuric acid is used. $H_2SO_4$ can be used in commercial concentrations of 93-98% and up to commercial "oleum" containing up to about 80% dissolved $SO_3$.

The alkanol/water mixture used to dissolve the free acid complex of Paper Yellow 11 should contain less than about 50% water. More than 50% water in the mixture dissolves too much of the inorganic salt, thus reducing the separation of the salt and decreasing the stability of the final product. Preferably less than 30% water is present with the optimal amount being in the range 20-30% water, the balance being either methanol or ethanol.

Methanol is the preferred alkanol as it does not form an azeotrope with water (in contrast to ethanol) and its cost is lower than ethanol. As it does not form an azeotrope, it can be separately distilled from the final product during the concentration stage. The distilled methanol can be recycled.

After the methanol/water mixture is added to the starting tetrasodium Paper Yellow 11 complex, the mixture is slurried and the acid is added to form the free acid complex. The sulfuric acid is added in amounts to reduce the pH of the slurry to below 2.5, preferably below pH 2.0 and optimally in the range 1.5 to 2.0. The initial slurry is refluxed for an hour.

It was found that the amount of acid required varied inversely with the temperature. At reflux, only the stoichiometric amount of sulfuric acid was required for complete conversion of the sodium complex to the free acid complex. No excess was required.

By using the minimum amount of sulfuric acid, the amount of alkanolamine needed to neutralize and form the alkanolamine complex as well as to neutralize the excess acid was at a minimum.

The acidified mixture, after refluxing for at least an hour to ensure conversion to the free acid complex and to promote crystal growth of the salt is neutralized with an alkanolamine to a pH above 6.0 and preferably in the range 6.3 to 6.8 at temperatures in the range 60—reflux. This formed the soluble alkanolamine complex of the Paper Yellow 11 and caused the inorganic sodium salt of the acid to precipitate. The sodium salt is easily removed from the Paper Yellow 11 alkanolamine complex by filtration with slight losses (<1%) of the dye.

The alkanolamines which form liquid water-soluble complexes of Paper Yellow 11 have the formula

wherein at least one of R', R" and R''' are HO(CH$_2$)$_n$— and the rest are either H or CH$_3$(CH$_2$)$_m$; n being an integer of 2–6 and m being an integer of 0–5; and mixtures of such alkanolamines. Particularly useful alkanolamines are triethanolamine, diethanolamine, di-isopropanolamine, N-methyl-diethanolamine, N,n-butyl-diethanolamine, ethanolamine and mixtures thereof. Triethanolamine is the preferred alkanolamine. Particularly useful from an economic point of view is the commercially marketed (Union Carbide Chemical Corp.) mixed alkanol amines containing 85% triethanolamine and 15% diethanolamine. This is an inexpensive unrefined product which provides eminently satisfactory Liquid Paper Yellow 11 concentrates by the above described process.

It should be noted that multihydroxy alkanolamines such as glucoseamine are not useful in the process of this invention.

As mentioned above, the free acid complex formation is promoted at reflux temperatures. It also reduces the acid requirement to stoichiometric proportions. The alkanolamine complex formation does not require this elevated temperature but it is useful to maintain the temperatures during this stage above about 65° C. so that the viscosity of the alkanolamine, particularly the preferred triethanolamine, is low enough to facilitate the filtration.

In the preferred procedures the yield in the laboratory averaged about 99%. The final liquid Paper Yellow 11 was extremely fluid at room temperature, in contrast to the viscosity of the alkanolamine. The quality of the product was constant from all the prescribed starting materials i.e. the condensation reaction mass, the wet cake and the technical grade dry Paper Yellow 11 powder. The products did not change in viscosity or contain any solids upon standing for 9 months at 25° C. or under accelerated aging for two weeks at 0° to 5° C.

The reactions are best carried out in 316 SS vessels or glass reactors.

The process will be described more fully in the examples. It is to be understood that the procedures are illustrative of the preferred mode but are merely exemplary. Changes in scale, art-recognized equivalent substitutes for the starting materials and/or reactants intended as long as they fall within the ambit of the current status of the art and within the ambit of the disclosure.

EXAMPLE 1

To a 5 necked 2 l flask equipped with thermometer, condenser, and pH probe charge 30 g Paper Yellow powder, dry cake 70 g, H$_2$O and 200 g methanol, add 7.5 g of 98% sulfuric acid. The internal temperature rises to 32° C. Heat to 72° C. (reflux temperature) while stirring. Agitate for 1 hour at that temperature and cool to 65° C. Neutralize the reaction mass to pH 6.3 by adding TEA over 15 minutes. Heat to 72° C. and agitate for 15 minutes. Cool on Buchner Funnel. Distill the methanol from the filtrate by vacuum filtration or simple distillation. Distillation is complete when the vapor temperature is 98° C. or the weight of the product is 85 g. Max=417 nm. Adjust the strength by adding water to absorbence of 24.

EXAMPLE 2

Following the procedure of Example 1 but substituting 200 gm of ethanol for the methanol provided a similar product of equivalent tinctorial strength.

EXAMPLE 3

Following the procedure of Example 1, but substituting the TEA-DEA, 85–15% mixture for the TEA provided product equivalent to that of Example 1.

EXAMPLE 4

Ten grams of bleached cellulose was suspended in 500 ml water (pH=about 7). The mixture was agitated to permit the fibers to swell and hydrate. This took about 30 minutes to an hour and then 2.5 gms of the dyestuff liquid obtained in Example 1, was added to the synthetic furnish. Water was added to 700 ml total volume and agitation was continued for 30 minutes. The furnish was poured into a lab Fourdrinier screen and formed into paper sheets. The resulting paper was uniformly dyed to an intense yellow color with a reflectance value of 38 at λmax. at 440 nm.

EXAMPLE 5

The product of Example 1, before tinctorial adjustment was buffered with 20% urea and commercial levelling agents and then adjusted to proper optical density. When the resulting solution was used in paper dyeing according to Example 4, the dyed paper had good wet fastness and a level dye coloring. After exhausting of the dye bath, the discarded water had practically no residual color. This indicatd excellent substantivity of the liquid Direct (Paper) Yellow 11 of this invention to cellulose. The dye absorbtion was so complete that the waste water could be directly disposed as "white water" waste.

What is claimed is:

1. A process for the preparation of a liquid dyestuff of CI Direct Yellow 11 (Paper Yellow 11) in stable form, from the tetrasodium complex of this stilbeneazo(xy) condensation of 4-nitrotoluene-2-sulfonic acid, using as starting material the reaction mass, wet cake or the dried technical grade of the condensed tetrasodium complex which comprises the steps of suspending the starting material in an alkanol/water medium, said alkanol being methanol or ethanol; acidifying said suspension to a pH below about 2.5 with a strong inorganic acid; heating said suspension at reflux to form the acid state of said stilbeneazo(xy) complex; neutralizing the resultant heated mixture with an alkanolamine base to a pH above 6.3 to form a solution of the resulting stilbeneazo(xy) complex and a precipitate of the sodium salt from the alkanol/water solution of the Direct Yellow 11—alkanolamine complex and then concentrating the liquid in solution by distilling off the alkanol.

2. The process according to claim 1 wherein said strong inorganic acid is sulfuric or hydrochloric acid.

3. The process according to claim 1 wherein said strong acid is sulfuric acid and said inorganic salt is alcohol-insoluble sodium sulfate.

4. The process according to claim 1 wherein said alkanol is methanol.

5. The process according to claim 1 wherein said alkanolamine has the formula

where at least one of R', R" or R''' are HO(CH$_2$)$_n$; the rest being CH$_3$(CH$_2$)$_m$ or H; n is a whole number from 1 to 6 and m is a whole number from 0 to 6.

6. The process according to claim 5 wherein said alkanolamine is selected from the group consisting of triethanolamine, diethanolamine, diisopropanolamine, N-methyl-diethanolamine, N,n-butyl-diethanolamine, ethanolamine and mixtures thereof.

7. The process according to claim 6 wherein said alkanolamine is triethanolamine.

8. The process according to claim 6 wherein said alkanolamine is diethanolamine.

9. The process according to claim 6 wherein said alkanolamine is a mixture of about 85 wt % triethanolamine and about 15 wt % diethanolamine.

* * * * *